(12) United States Patent
Sun et al.

(10) Patent No.: US 12,284,487 B2
(45) Date of Patent: *Apr. 22, 2025

(54) HEARING AID HAVING A SENSOR (71) Applicant: Oticon A/S, Smørum (DK)

(72) Inventors: Hongyan Sun, Allerød (DK); Martin Kuriger, Fribourg (CH); Morten Christophersen, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,947

(22) Filed: Jun. 28, 2023

(65) Prior Publication Data

US 2023/0396940 A1 Dec. 7, 2023

Related U.S. Application Data

(63) Continuation of application No. 17/699,468, filed on Mar. 21, 2022, now Pat. No. 11,736,872.

(30) Foreign Application Priority Data

Mar. 19, 2021 (EP) .................................... 21163760

(51) Int. Cl.
*H04R 25/00* (2006.01)
*G01P 15/18* (2013.01)

(52) U.S. Cl.
CPC ......... *H04R 25/505* (2013.01); *H04R 25/552* (2013.01); *H04R 25/604* (2013.01); *H04R 25/609* (2019.05); *G01P 15/18* (2013.01); *H04R 2225/43* (2013.01)

(58) Field of Classification Search
CPC .. H04R 25/505; H04R 25/609; H04R 25/552; H04R 25/604; H04R 2225/43; G01P 15/18
See application file for complete search history.

(56) References Cited

U.S. PATENT DOCUMENTS

| | | | |
|---|---|---|---|
| 11,736,872 B2 * | 8/2023 | Sun | H04R 25/604 |
| | | | 381/23.1 |
| 2005/0063553 A1 | 3/2005 | Ozawa | |
| 2013/0223660 A1 | 8/2013 | Olafsson et al. | |
| 2014/0270231 A1 | 9/2014 | Dusan et al. | |
| 2018/0286373 A1 | 10/2018 | O'Connell et al. | |
| 2020/0186944 A1 | 6/2020 | Leenen | |
| 2020/0314525 A1 * | 10/2020 | Thielen | H04R 1/1041 |

OTHER PUBLICATIONS

Extended European Search Report, issued in Priority Application No. 21163760.8, dated Aug. 12, 2021.

* cited by examiner

*Primary Examiner* — Mark Fischer
(74) *Attorney, Agent, or Firm* — Birch, Stewart, Kolasch & Birch, LLP (57) ABSTRACT

A hearing aid and a method performed by a hearing aid including at least one microphone unit, an accelerometer unit, and a processor. The method performed by the hearing aid includes generating a processed microphone signal including attenuating the microphone signal in accordance with an attenuation value; wherein the attenuation value is based on a measure of correlation between a microphone signal from the microphone unit and an acceleration signal from the accelerometer unit. The hearing aid instantly reduces noise arising from mechanical handling of the hearing aid based on input from the microphone unit and the accelerometer unit.

21 Claims, 4 Drawing Sheets

HEARING AID HAVING A SENSOR

This application is a Continuation of copending application Ser. No. 17/699,468, filed on Mar. 21, 2022, which claims priority under 35 U.S.C. § 119 (a) to Application No. 21163760.8, filed in Europe on Mar. 19, 2021, all of which are hereby expressly incorporated by reference into the present application.

INTRODUCTION

The present disclosure relates to a hearing aid having a sensor. More particularly, the disclosure relates to a hearing aid configured to reduce noise induced by e.g., touching the hearing aid.

A hearing aid comprises a microphone system, including one or more input transducers, configured to convert an acoustic signal, representing sounds, into electric signals for processing to, at least partially, compensate for a hearing loss of a wearer of the hearing aid. The hearing aid may include processing means including one or more of frequency-dependent amplification, frequency-dependent dampening, frequency transposition, noise reduction, beamforming, own voice pickup etc. A hearing aid may also include processing means for connecting with the hearing aid wearer's mobile phone, such as a smart phone, e.g., using short-range radio communication, wherein the hearing aid is configured for picking up the wearer's own voice and for outputting the voice/sound from a far-end of a call.

It may happen that noise (handling noise) caused by handling the hearing aid e.g., by touching or moving the hearing aid is picked up by the microphone system and reproduced as undesired sound (sound artefacts, e.g., annoying sound artefacts). The sound artefacts may be reproduced by a receiver (loudspeaker) at the hearing aid leading to sound artefacts for the hearing aid wearer or transmitted with the hearing aid wearer's own voice to a far-end of a call via the hearing aid wearer's mobile phone.

Handling noise is also caused in connection with the hearing aid wearer putting on glasses, operating a push-button, a rotatable wheel, a tumbler switch, a slider etc. The sound artefacts may occur also in connection with jewellery touching or hitting the hearing aid, a spectacle frame touching or hitting the hearing aid, etc.

If only one of e.g., two microphones pick up the noise, it is possible that an existing wind noise reduction algorithm may be sufficient to handle the noise, i.e., suppress noise sufficiently that it does not become annoying for the user. Such a wind noise reduction system usually applies attenuation if the two microphone signals are sufficiently different.

The significant part of these mechanical noises mentioned above, however, get equally picked up by both microphones, resulting in very similar microphone signals. A wind noise reduction then does not work in such situations. It's then very hard to remove these mechanical artefacts because there is no unique sound feature that helps to identify them.

This is an omnipresent problem that possibly may affect most hearing device users in some way. The sound quality of the hearing device is degraded in these situations and as a result, speech understanding may be reduced. It also applies to hearing device accessories, such as remote microphones configured to pick up sound in a location remote from the user's head, e.g., as a device configured to be positioned on/attached to a partner's clothes or on a table, where the movement of the clothes may be picked up by the microphones, as well as the noise arising from handling such a device located on a table. In a two-way audio setup, the far end listener will be highly annoyed by these artefacts.

PRIOR ART

US 2013/223660 A1 (OLAFSSON) discloses a hearing enhancement device for selectively enhancing ambient sound in accordance with head or body movements, which may be specifically learned by the user to enact signal processing algorithms or other acoustic enhancement features for a specific purpose, either by quick movements such as nods, repetitive movements, or by orienting the head in certain ways or directions with respect to the body. Thus, a user may learn to optimize the signal processing by sending commands to the signal processing system by way of various body movements. The hearing device can thus selectively enhance ambient sound in accordance with recognized head gestures.

US 2005/063553 A1 (O. KAZUHIKO) discloses the use of a vibration sensor together with a plurality of microphone units to accurately pick up and use only the target vibration noise, thereby enabling to cancel out the vibration dependent noise from the audio signal of the microphone without the need for disposing the microphones in an opposed relationship.

However, cancelling out vibration dependent noise from the audio signal from microphone requires vibration noise with harmonic components, e.g., from motors, and doesn't work well for cancelling sudden, transient, noise artefacts such as those induced by a wearer handling or operating a hearing aid.

SUMMARY

It has been observed that the undesired sounds are picked up by microphones accommodated in the hearing aid and that the undesired sounds may be associated with touches, strokes or blows to the hearing aid. One reason may be that microphones are very sensitive to such touches, strokes or blows to the hearing aid e.g., in vicinity of a sound port leading to a microphone. There is provided:

A method performed by a hearing aid (100) including at least one microphone unit (113), an accelerometer unit (112), and a processor, comprising:
- determining a first sound signal level based on a microphone signal (ms) from at least one microphone unit;
- determining a noise floor level (LN) based on the microphone signal from the at least one microphone unit (113);
- determining a second sound signal level based on a difference between the first sound signal level and the noise floor level;
- determining an acceleration level based on an acceleration signal (as) from the accelerometer unit (112);
- generating a processed microphone signal (pm) including attenuating the microphone signal (ms), at least at a first time (t2), in accordance with a first attenuation value (av); wherein the first attenuation value (av) is based on determining a degree of simultaneously increased levels, if any, of the second sound level at the first time and the acceleration level at the first time.

The method enables that the processed microphone signal contains undesired sounds at an attenuated level only. Sound quality in the processed microphone signal can be greatly improved since the undesired sounds can be at least attenuated or suppressed since such undesired sounds cooccur, simultaneously, with accelerations levels, measurable using the accelerometer in the hearing aid. This in turn enables suppressing the undesired sounds, rather than other, desired sounds in the processed microphone signal. As mentioned, the undesired sounds may be associated with touches, strokes or blows e.g., caused by tap-like touches on the hearing aid, handling touches on the hearing aid, jewellery or other objects touching the hearing aid. The method enables attenuation of the undesired sounds the moment they occur. An event causing a cooccurring sound and acceleration may thus result in the sound being suppressed. Thereby, the event may be perceived as not being annoying or disturbing for a wearer of the hearing aid. This greatly increases the perceived quality of the hearing aid.

The method applies increased levels of attenuation at times when the measure is indicative of simultaneously increased levels of the second sound level at the first time and the acceleration level at the first time. Correspondingly, the method applies lower levels of attenuation at times when the measure is not indicative of simultaneously increased levels of the second sound level at the first time and the acceleration level at the first time—e.g., at times when either the second sound level or the acceleration level, but not both of the second sound level and the acceleration level, exhibits an increased level.

The degree of simultaneously increased levels, if any, of the second sound level and the acceleration level may be determined in different ways. The first sound signal level may be an envelope of the microphone signal and the acceleration signal may be an envelope of the acceleration signal. In some examples, the envelopes are obtained by selecting extreme values of the signals and/or by rectifying the signal and lowpass filtering the rectified signal.

In some embodiments determining the degree of simultaneously increased levels includes determining a degree of correlation and/or a degree of coherence and/or a degree of cooccurrence and/or a degree of similarity and/or a degree of instant similarity between the second sound level and the acceleration level. The measure of coherence or magnitude-squared coherence is a real-valued function providing a coherence value in the numerical range 0 to 1. The correlation may be a normalized correlation.

In some examples, determining the degree of simultaneously increased levels is based on mean values of instant values of the microphone signal and mean values of the acceleration signal. The mean values may be obtained by one or more filters. The mean values may constitute an envelope or resemble an envelope of the microphone signal and the acceleration signal.

In some embodiments the method comprises:
determining a first envelope based on the second sound signal level or the first sound signal level;
determining a second envelope based on the acceleration level;
wherein the degree of simultaneously increased levels is based on the first envelope and the second envelope.

Thereby attenuation may be stable over some periods of time e.g., over periods of time when the hearing aid is being touched, stroked, or hit.

In some examples, the first envelope and/or the second envelope is a smooth curve outlining extreme values of the signal levels. In some examples, the envelope is estimated based on a so-called Hilbert transform or a moving RMS amplitude. In some examples, the first envelope and/or the second envelope is/are based on a short-time mean value, wherein the short-time mean value varies significantly faster than the noise floor at least at times when the microphone signal contains speech.

In some examples, the degree of simultaneously increased levels, if any, of the second sound level and the acceleration level is based on the first envelope at the first time and the second envelope at the first time.

In some embodiments the method comprises:
determining the first attenuation value (av) based on a mapping function (401) between the degree of simultaneously increased levels and the first attenuation values (av).

The mapping function enables gradually applying more or less attenuation in dependence of the degree of correlation between the sound signal and the acceleration signal. The correlation may be a measure of the likelihood of the sound signal being associated with being an undesired sound or a sound artefact.

The mapping function may include one or more knee points. The knee points may serve to include different slopes of attenuation as a function of the first coherence values or the first correlation values. The mapping function may be implemented using only limited processing resources.

In some examples, the mapping function defines a first attenuation value, a second attenuation value and monotonically increasing or decreasing first attenuation values as a function of the first coherence values or the first correlation values. This enables controlling the amount of attenuation to be applied, while enabling a resource-efficient implementation. In some examples the first attenuation value is a minimum attenuation value corresponding to 0 dB or another value. In some examples the second attenuation value is a maximum attenuation value corresponding to a value in the range e.g., −10 to −20 dB, e.g. 12 dB or another value.

Alternatively, mapping function enables gradually applying more or less attenuation in dependence of the degree of simultaneously increased levels, if any, of the second sound level and the acceleration level.

In some embodiments the method comprises:
in accordance with the degree of simultaneously increased levels, being less than a first threshold value (Ca), setting the attenuation value to a first attenuation value; and
in accordance with the degree of simultaneously increased levels being greater than the first threshold value (Ca), setting the attenuation value to a value which is a function of the coherence value.

It is thereby possible to forgo attenuation of the microphone signal for values of the degree of simultaneously increased levels below the first threshold value. Consequently, gentle touches of the hearing aid at sufficiently small accelerations, will not cause attenuation of sound artefacts. In some examples the first value is or corresponds to 0 dB or another value.

The measure of coherence or magnitude-squared coherence is a real-valued function providing a coherence value in the numerical range 0 to 1. The first threshold may be then be set to a value between 0 and 1.

In some embodiments the method comprises:
in accordance with the degree of simultaneously increased levels, being greater than a second threshold value (Cb), setting the attenuation value to a second attenuation value; and
in accordance with the degree of simultaneously increased levels being greater than the second threshold value (Cb), setting the attenuation value to a value which is a function of the coherence value.

It is thereby possible to apply a maximum attenuation of the microphone signal for values of the degree of simultaneously increased levels greater than the second threshold value. Consequently, significant blows or strokes of the hearing aid, at strong accelerations, cause an attenuation of sound artefacts, but a limited attenuation to avoid artefacts caused by a sudden and deep attenuation e.g., below the noise floor. In some examples the second value is or corresponds to a value in the range −10 to −20 dB, e.g. 12 dB or another value. The second threshold may be set to a value between 0 and 1 or in another range.

In some embodiments the attenuation value (av) is based on the second sound level at the first time This enables an attenuation proportional or at least based on the second sound level i.e. the sound level above the noise floor. In some examples, the attenuation value is limited in accordance with the second sound signal level. E.g., to limit an attenuation value such that the microphone signal is not attenuated below the noise floor level.

In some embodiments at least a range of the attenuation values are piecewise proportional or piecewise logarithmically proportional or piecewise exponentially proportional to the degree of simultaneously increased levels; and/or
the attenuation value is piecewise proportional or piecewise logarithmically proportional or piecewise exponentially proportional to the second sound signal level.

The attenuation value may be gradually increased, in accordance with a first function, to follow an increasing correlation or coherence value. Correspondingly, the attenuation value may be gradually decreased, in accordance with the first function, to follow a decreasing correlation or coherence value.

In an example, the second instant sound signal level is 4.3 dB (above the noise floor) and the attenuation value is accordingly −4.3 dB (factor 0.27). Correspondingly, for a second instant sound signal level of 3.8 dB, the attenuation value is accordingly −3.8 dB (factor 0.45). The proportionality provides a less disturbing or more pleasant sound image especially at times when attenuation effectively attenuates an undesired sound or is about to increase or decrease attenuation. The attenuation may thus be proportional to the second instant sound signal level to avoid suddenly lowering the noise floor significantly, which would also cause an unpleasant sound image.

In some examples, wherein the microphone signal includes first signal values; and wherein determining the first instant sound signal level (LS) comprises: determining a norm of signal values; wherein the current sound pressure level (LS) is based on the norm of the signal values. The norm of the signal values may be a 1-norm (an absolute value), a 2-norm (squared values) or a higher order norm.

In some examples, the microphone signal includes first signal values; and wherein determining the noise floor level comprises: determining a norm of the signal values; determining the logarithm of the norm of the signal values; and determining a mean value based on the logarithm of the norm of the signal values; wherein the noise floor level is based on the mean value. The mean value may be determined using a filter with an infinite impulse response or a finite impulse response. The noise floor is thus less susceptible to sudden changes compared to the first instant sound signal. The noise floor remains substantially constant during periods with speech. The noise floor may be estimated using linear or non-linear filtering.

In some embodiments the method comprises:
receiving a two-dimensional or three-dimensional accelerometer signal from the accelerometer and determining the acceleration level based on the two-dimensional or three-dimensional accelerometer signal; wherein the acceleration level is a one-dimensional signal or a two-dimensional signal.

The acceleration level may be based on filtering e.g., lowpass filtering or bandpass filtering. The acceleration level may be based on weighing signal values from different accelerometer dimensions differently. Thereby, the chance of attenuating annoying sounds related to the hearing aid being suddenly touched, stroked, or hit can be increased. This may be based on knowledge of the orientation of the accelerometer in the hearing aid and that the hearing aid is positioned, in a normal position during use, at least substantially.

In some embodiments, determining the degree of simultaneously increased levels includes determining a likelihood of an event of the hearing aid being suddenly touched, stroked or hit.

The likelihood of an event of the hearing aid being suddenly touched, stroked or hit may be determined based on a measure derived from recording microphone signals and accelerometer signals from the microphone unit and accelerometer unit in the hearing aid during experiments including touching, stroking and hitting the hearing aid in connection with conventional use of the hearing aid. The experiments may also include conventional use of the hearing aid including head and body movements of the wearer of the hearing aid, including and/or excluding touching, stroking and hitting the hearing aid.

The likelihood of an event of the hearing aid being suddenly touched, stroked or hit may be determined based on a measure derived from recording microphone signals and accelerometer signals from the microphone unit and accelerometer unit in the hearing aid during experiments including touching, stroking and hitting the hearing aid in connection with conventional use of the hearing aid. The experiments may also include conventional use of the hearing aid including head and body movements of the wearer of the hearing aid, including and/or excluding touching, stroking and hitting the hearing aid.

In some embodiments the method comprises:
filtering the signal from the accelerometer unit by a bandpass filter (BPF) to provide bandpass filtered acceleration values; wherein the bandpass filter (BPF) is configured to emphasize acceleration values associated with an event of the hearing aid being suddenly touched, stroked or hit over acceleration values associated with a head movement of the hearing aid.

Characteristics of the bandpass filter may be tuned based on experiments e.g., experiments as described above.

In some embodiments the method comprises:
converting one or more of the microphone signal and the acceleration signal into a time-frequency domain; and
performing one or more of the steps of the method based on the respective signals in the time-frequency domain to generate a processed microphone signal in the time-frequency domain.

The conversion may be based on a short-term Fourier transformation e.g., a Fast Fourier Transform or a filter bank.

In some embodiments the method comprises:
converting the processed microphone signal, in the time-frequency domain, to a time-domain signal.

The conversion may be based on a short-term inverse Fourier transformation e.g., an Inverse Fast Fourier Transform or a summation or another linear or non-linear conversion.

There is also provided a hearing aid comprising a microphone unit (113), an accelerometer unit (112), and a processor (120), wherein the processor is configured to perform the method as set out above.

There is also provided a hearing aid system comprising a first hearing aid as set out above and a second hearing aid in as set out above, wherein the hearing aid system is a binaural hearing aid system.

Herein, a hearing aid is also denoted a hearing device.

BRIEF DESCRIPTION OF THE FIGURES

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device according to the present disclosure may be wireless connected to an external device, such as a mobile telephone, a base station for a landline telephone, an intermediate communication device, such as a remote microphone. Such wireless connections may be established using one or more protocols, which could be a Bluetooth protocol, such as Bluetooth low energy, or proprietary or open protocols.

A hearing device (or hearing instrument, hearing assistance device) may be or include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss. The "hearing device" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

The hearing device may be adapted to be worn in any known way. This may include i) arranging a unit of the hearing device behind the ear with a tube leading air-borne acoustic signals into the ear canal or with a receiver/loudspeaker arranged close to or in the ear canal and connected by conductive wires (or wirelessly) to the unit behind the ear, such as in a Behind-the-Ear, BTE, type hearing aid, and/or ii) arranging the hearing device entirely or partly in the pinna and/or in the ear canal of the user such as in an In-the-Ear type hearing aid or In-the-Canal/Completely-in-Canal type hearing aid, or iii) arranging a unit of the hearing device attached to a fixture implanted into the skull bone such as in a Bone Anchored Hearing Aid or a Cochlear Implant, or iv) arranging a unit of the hearing device as an entirely or partly implanted unit such as in a Bone Anchored Hearing Aid or a Cochlear Implant.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include one or more auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g., a mobile phone (such as a smartphone) or a tablet or another device, e.g., comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g., a PC. The auxiliary device may further be adapted to (e.g., allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g., for providing direction-dependent audio signal processing. Such directional microphone system is adapted to (relatively) enhance a target acoustic source among a multitude of acoustic sources in the user's environment and/or to attenuate other sources (e.g., noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing devices, the output unit may include one or more output electrodes for providing the electric signals such as in a Cochlear Implant.

Figure 1:
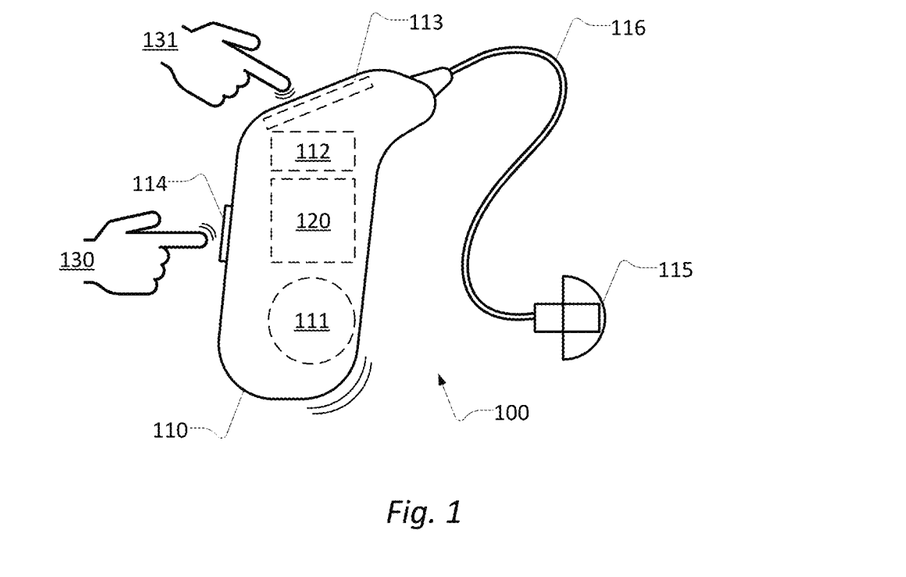
FIG. 1 shows a hearing aid.

FIG. 1 shows a hearing aid. The hearing aid 100 is configured as a behind-the-ear device with a behind-the-ear part 110, an in-the-ear part 115 and a connecting member 116. The behind-the-ear part 110 accommodates a battery 111, e.g., a rechargeable battery, a processor 120, an accelerometer 112, a microphone unit 113, and a user-interface, UI, unit 114 configured to receive an input from a wearer of the hearing aid. The UI unit 114 may comprise one or more of one or more buttons, a tumbler switch, a slider switch, and a rotary switch. In some embodiments, the UI unit may be configured to detect tap-gestures using the accelerometer. The wearer's operation of the UI unit 114 is illustrated by the hand 130.

The accelerometer may be a one-axis, two-axis, or three-axis accelerometer. In some embodiments, the accelerometer explicitly outputs acceleration values. In some embodiments, the accelerometer is constituted by a movement sensor providing one or more of acceleration values, position values, and velocity values.

The microphone unit 113 may comprise one or more microphones, e.g., comprising a microphone array. The microphone or microphones receive acoustic waves via one or more sound-inlet ports. As described, it may happen that the wearer touches the hearing aid, in particular the behind-the-ear part 110, at or in vicinity of such a sound-inlet port causing undesired, e.g., harsh, sounds to be picked up by the microphones. It has been observed that the undesired sounds may be associated with touches, strokes, e.g., while handling the hearing aid, or blows, e.g., by jewellery hitting the hearing aid. The wearer may touch the hearing aid close to the microphones or sound-inlet port(s) as illustrated by the hand 131. It has been discovered that at least some touches, strokes, or blows to the hearing aid may be sensed by the accelerometer. As described herein, e.g., in connection with FIGS. 3, 5 and 6, a signal from the accelerometer may be processed simultaneously with a signal the microphone unit to attenuate such undesired sounds.

Figure 2:
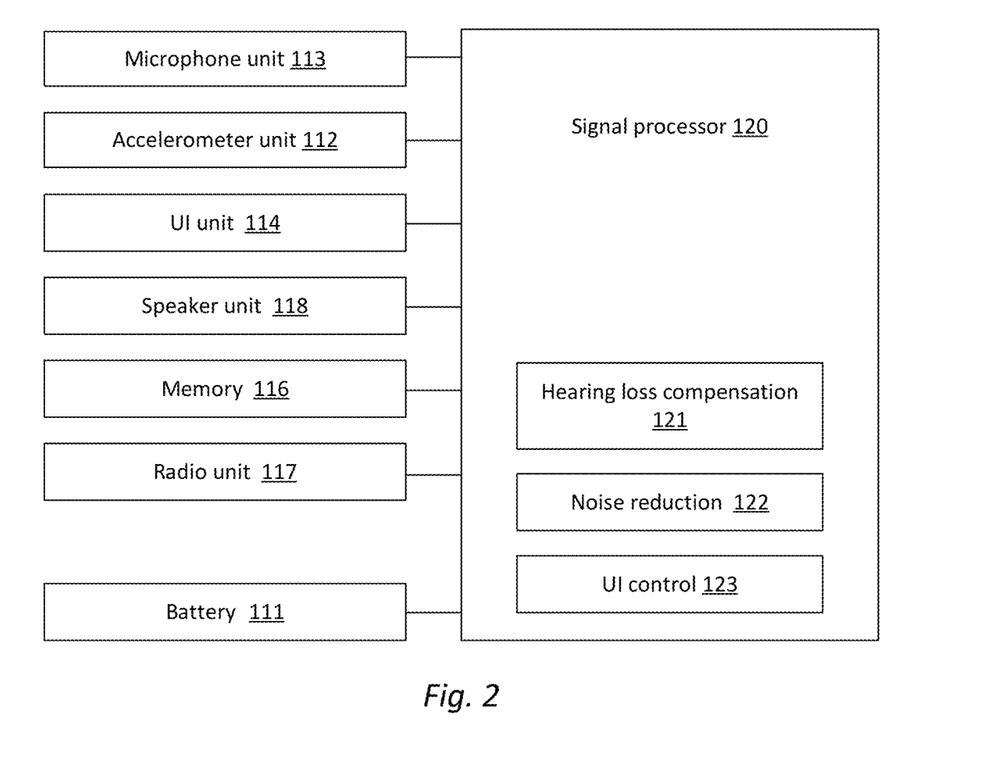
FIG. 2 shows a block diagram of a hearing aid.

FIG. 2 shows a block diagram of a hearing aid. The block diagram includes the microphone unit 113, the accelerometer unit 112, the UI unit 114, a speaker unit 118, e.g., accommodated in the in-the-ear-part 115, a memory 116, a radio unit 117, the battery 111 and the signal processor 120. The processor may include one or more components, e.g., including a component including one or both of software and hardware. The signal processor 120 may include a component 121 for hearing loss compensation and component 122 for noise reduction and a component 123 enabling the wearer or another party to control the hearing aid, e.g., via the radio unit 117 and/or via the UI unit 114 or in another way.

The microphone unit 113 may include one or more beamformers providing directionality of the microphone unit, e.g., to provide spatial noise suppression. The directionality may be controlled by the signal processor e.g., in response to signals from the accelerometer 112.

The radio unit 117 may provide radio communication e.g., in accordance with a Bluetooth standard, e.g., a Bluetooth low-energy, BLE, standard, or another radio standard. The radio unit 117 may additionally or alternatively provide communication with another hearing aid e.g., to the other hearing aid in a binaural hearing system.

Figure 3:
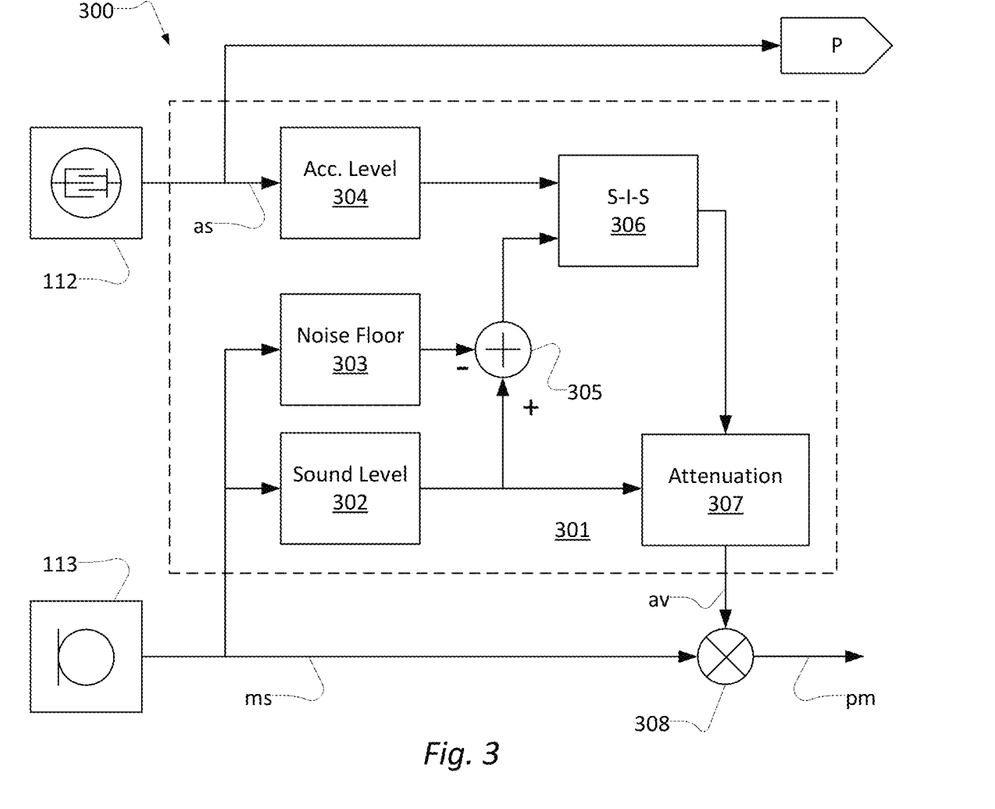
FIG. 3 shows a first signal processing diagram.

FIG. 3 shows a first signal processing diagram for a first method. The first method may be implemented by the signal processor 120, e.g., by the component 122 for noise reduction. In accordance with the first method, the accelerometer 112 provides an accelerometer signal, as, and the microphone unit 113 provides a microphone signal, ms. A processed microphone signal, pm, is output for one or more of further processing, reproduction in the ear of the wearer by means the speaker unit 118, and transmission to a remote end by means of the radio unit 117. The processed microphone signal, pm, includes the microphone signal, ms, however in accordance with a time-varying attenuation value, av. The time-varying attenuation value, av, provides attenuation, via multiplier 308, of the microphone signal at times when undesired sounds are sensed, simultaneously, by the microphone unit 113 and the accelerometer 112. The multiplier 308 may also be a controlled gain stage providing gain in a range e.g., below 0 dB.

The acceleration signal, as, is processed by a component 304 determining a signal representing the level of the acceleration signal. The level of the acceleration signal may be an envelope or envelope-like signal of the acceleration signal or another type of level of the acceleration signal.

Simultaneously, the microphone signal, ms, is processed by component 302 to determine a signal representing the level of the microphone signal. The level of the microphone signal may be an envelope or envelope-like signal of the microphone signal or another type of level of the microphone signal.

Further, e.g., simultaneously, the microphone signal, ms, is processed by component 303 to determine a signal representing the noise-floor level of the microphone signal. The noise-floor level may be an envelope signal or envelope-like signal, which is lowpass filtered. The noise-floor signal is more low-frequent than the level signal. For instance, a level signal is more responsive in terms of magnitude to e.g., speech picked up by the microphone unit than a noise-floor signal. The prior art provides methods for obtaining a noise-floor signal and for obtaining a level signal e.g., for obtaining an envelope or envelope-like signal.

A summer component 305 determines a level difference between the level of the microphone signal and the noise-floor. The summer component 305 thereby outputs a signal representing quantifying how much the level exceeds the noise-floor. This output is provided to component 306 currently with the level signal from the component 304.

The component 306 determines a degree of simultaneously increased levels, if any, of the level of the microphone signal and the level of the acceleration, e.g., by determining the cross-correlation or coherence between them. If the level of only one of the signals is at an increased level, the degree of simultaneously increased levels is low. If the level of both of of the signals is at an increased level, the degree of simultaneously increased levels is high. Different measures can be implemented to provide an output in terms of a degree of simultaneously increased levels. At times of simultaneously increased levels, the degree of simultaneously increased levels may be indicative of presence, in the microphone signal, of undesired sounds or undesired sound levels. In some examples, a slow head movement by the wearer of the hearing aid provides only a low level of acceleration, whereas a stroke or touch directly at the hearing aid provides a high level of acceleration.

The degree of simultaneously increased levels, if any, of the level of the microphone signal and the level of the acceleration is converted into an attenuation value, av, via component 307 providing suitable attenuation of the microphone signal, ms. The component 307 may receive the level signal from component 302 and/or the signal, representing the level difference between the level of the microphone signal and the noise-floor, from the summer 305.

In some embodiment the time-varying attenuation value, av, is a multi-dimensional value representing time-varying attenuation at one or more frequency bands. The first method may therefore include converting one or more of the microphone signal and the acceleration signal into a time-frequency domain; and performing one or more of the steps of the method based on the respective signals in the time-frequency domain to generate a processed microphone signal in the time-frequency domain. The first method may also include converting the processed microphone signal, in the time-frequency domain, to a time-domain signal.

Figure 4:
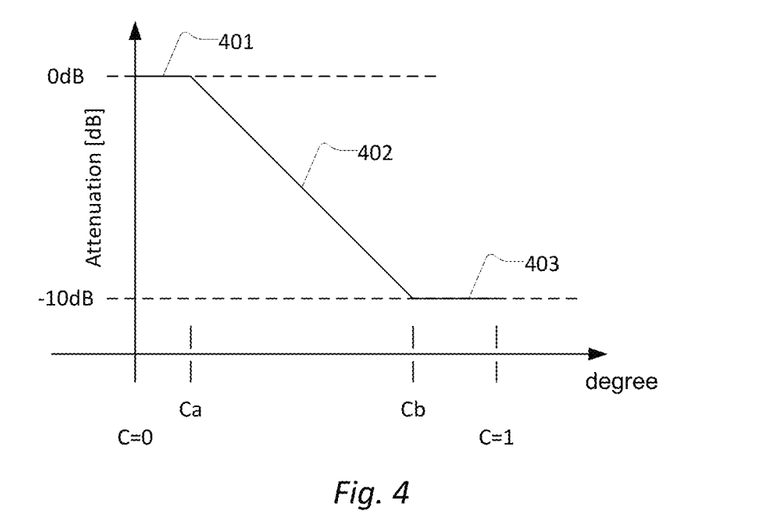
FIG. 4. shows an attenuation setting function.

FIG. 4. shows an attenuation setting function. The attenuation setting function may be implemented by the component 307 providing suitable attenuation of the microphone signal, ms. As mentioned, the degree of simultaneously increased levels, if any, of the second sound level and the acceleration level may be determined by cross-correlation or coherence between a level of the microphone signal and a level of the acceleration signal. The degree of simultaneously increased levels may be normalized to values in the range between 0 and 1.

The function is shown in a cartesian coordinate system with a linear abscissa (x-axis) representing the degree of simultaneously increased levels, c. The ordinate (y-axis) has a logarithmic scale representing the attenuation value, av, in dB.

For small values of c, e.g., c being less than a threshold value, Ca, the applied attenuation is 0 dB. See reference numeral 401. This occurs at times when the degree of simultaneously increased values is low.

For large values of c, e.g., c being greater than a threshold value, Cb, the applied attenuation is e.g., −10 dB (minus 10 dB) or another maximum attenuation value e.g., −20 dB. See reference numeral 403. This occurs at times when the degree of simultaneously increased values is high, e.g., at times when both of the microphone signal and the acceleration signal exhibits high levels, simultaneously.

For intermediate value of c corresponding to c being in the range between Ca and Cb, the applied attenuation is set in accordance with the shown sloped curve 402. Thereby, the applied attenuation value is changed proportionally to degree of simultaneously increased levels between a set minimum and a set maximum attenuation value.

Figure 5:
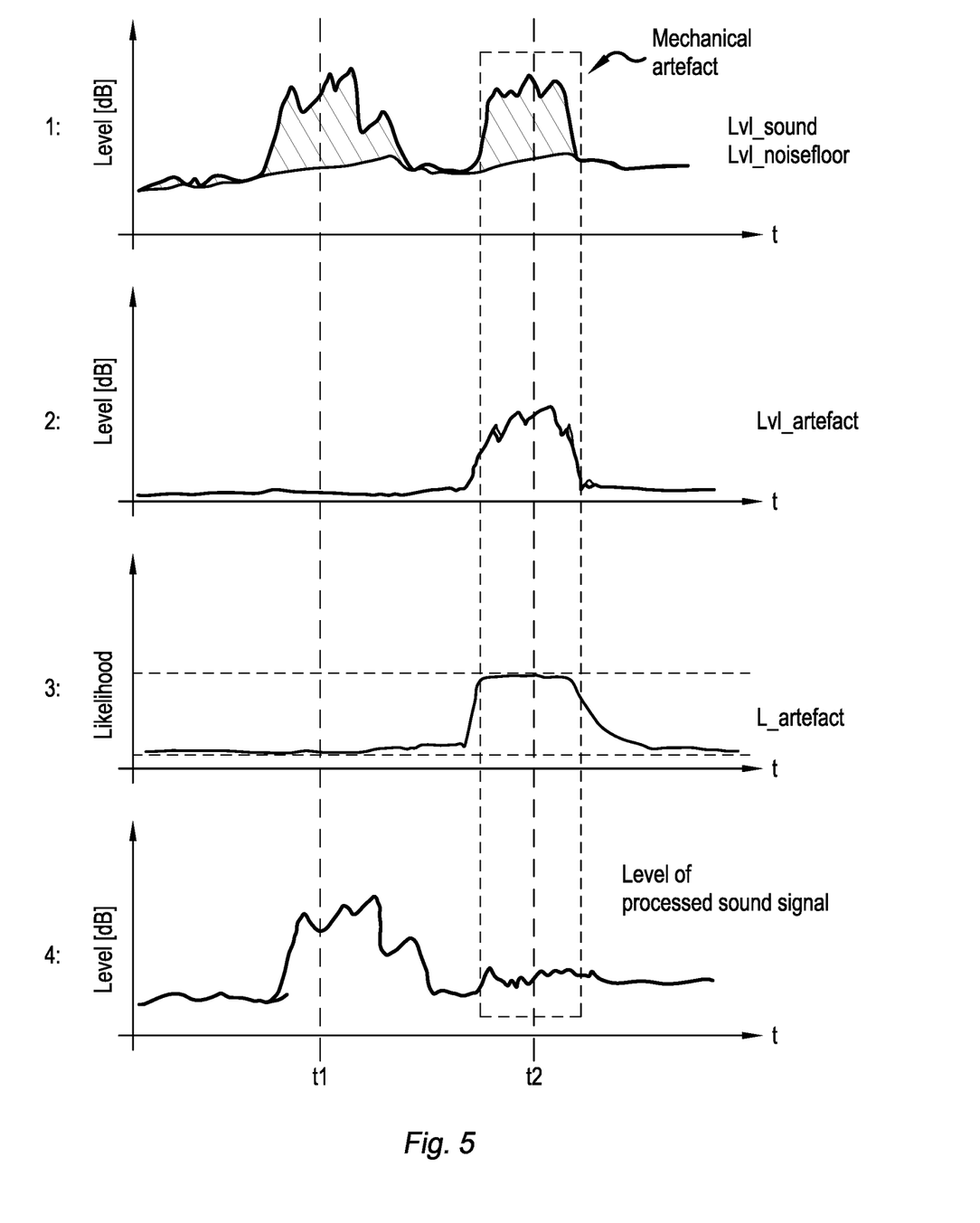
FIG. 5 shows subgraphs 1, 2 and 4 schematically illustrating level of an input signal in a hearing device and subgraph 3 schematically illustrating likelihood of an artefact being present.

FIG. 5 shows subgraphs 1, 2 and 4 schematically illustrates levels of an input signal in a hearing device and subgraph 3 schematically illustrating likelihood of an artefact being present. The level may be an envelope of the signal or a lowpass filtered signal. The subgraphs are shown in cartesian coordinate systems with time along the abscissa.

At a first time, t2, during a period with presence of an undesired sound originating from a mechanical artefact, e.g., due to touching the hearing aid, the level of the microphone signal (subgraph 1) is increased, above the noise floor, and, simultaneously, at time t2, the level of the acceleration signal (subgraph 2) is increased. The likelihood of the sound being an undesired sound, artefact, is high (subgraph 3). This enables attenuation of the microphone signal (subgraph 4) at the first time, t2, and during the period with presence of an undesired sound. As can be seen in this example, the microphone signal is suppressed to about the level of the noise floor. This prevents the noise attenuation, itself, appearing as an undesired artefact.

At a second time, t1, during a period with no presence of an undesired sound originating from a mechanical artefact, the degree of simultaneously increased values is low at least because the acceleration level is low. Therefore, the applied attenuation is low e.g., about 0 dB.

In some examples the degree of simultaneously increased levels of the sound level and the acceleration level correspond to the likelihood shown in subgraph 3 (designated L_artefact).

Figure 6:
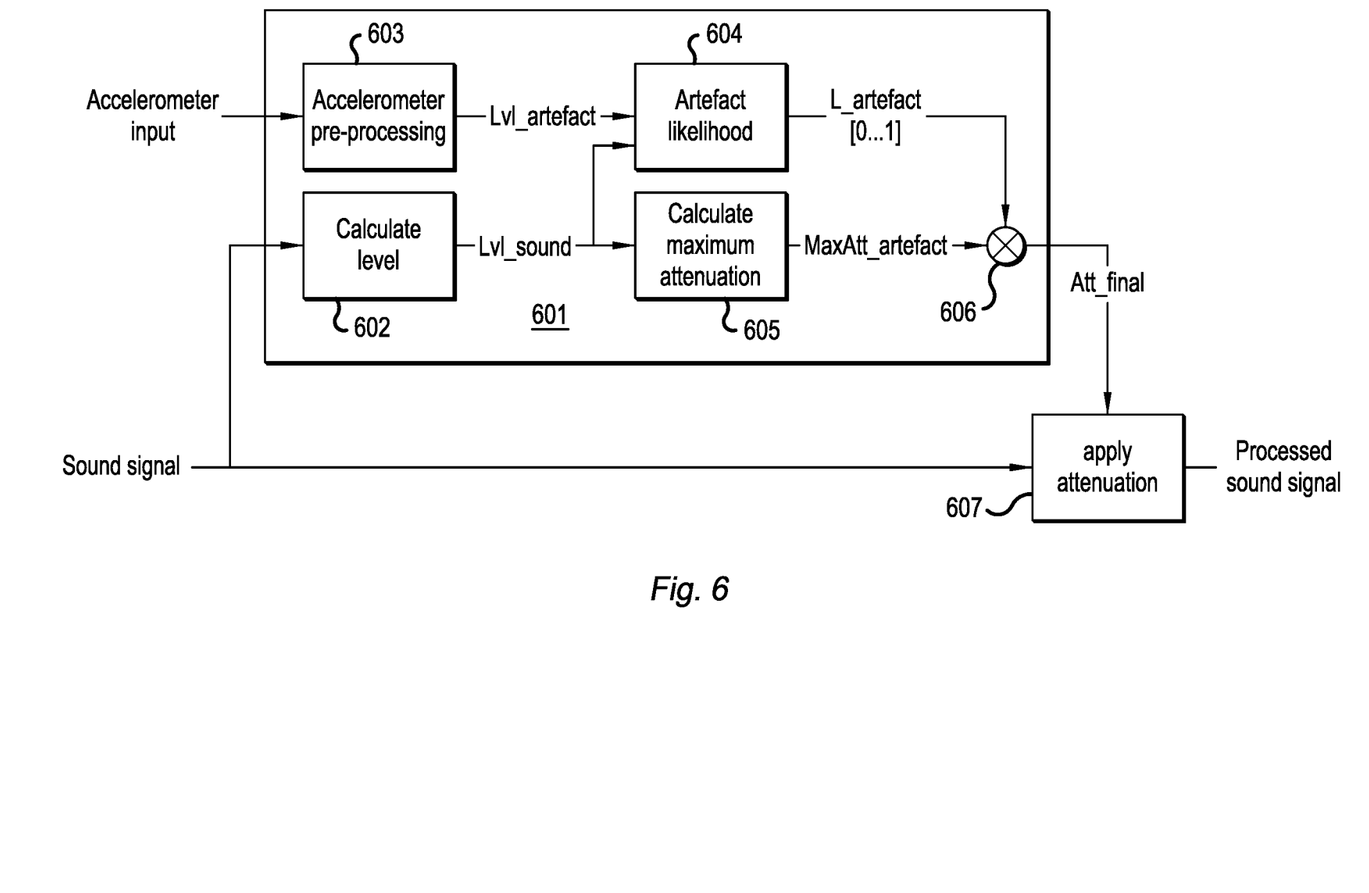
FIG. 6 shows a second signal processing diagram.

FIG. 6 shows a second signal processing diagram. The signal processing diagram illustrates functional blocks of part of a hearing device.

The hearing device is represented in part by a functional block 601 that takes one sound signal and one or more accelerometer signals as input. The output of the block is an attenuation signal which is applied 607 to the sound signal in order to optimally reduce the annoyance of mechanical artefacts.

Consequently, the device illustrated comprises a sound signal input, which is partly fed to a level estimator 602 configured to calculate or estimate the sound level in the sound signal. The sound signal is provided from an input system comprising a microphone. In some versions of hearing aids or devices, multiple microphones may be used to constitute the input system, this could for instance be a hearing aid or device, where a housing of the hearing aid or device, is configured to be positioned behind the ear of the user, and two microphones may then be arranged in that housing. In some versions, an additional, or one of two, microphones could be located in an in-the-ear housing configured to be positioned in or at the ear canal of the user.

The sound signal could be a signal provided after application of directionality processing, i.e. suppression of sounds from unwanted or undesired directions, which lessens the noise in the sound signal.

The level meter, or level estimator, 602 is configured to provide data relating to the level of sound picked up by the input system. As the input system may comprise several microphones as described above, the level may be calculated or estimated for each microphone signal or as combined by two or more of such microphones. As mechanical sound could be more present in one microphone than in another microphone, it could be advantageous to calculate or estimate a level for each of the microphones of the input system.

Further, level may be calculated on each, or a number of, channels/frequency bands in the input signal. For some purposes, a number of frequency channels could be combined for reducing calculation complexity and/or calculation resources needed.

An accelerometer of the hearing aid is arranged to provide an input signal to an accelerometer pre-processer. The accelerometer here is configured to provide a signal in 3 channels corresponding to 3 physical directions. This could be expressed as x-, y- and z-axis, e.g. vertical movement of the hearing aid, sideways movement and back-forth movement. Further, the accelerometer preprocessor 603 is utilized and configured to determine a 1-channel accelerometer signal based on the 3-channel accelerometer signal. This reduces the complexity of determining the likelihood of presence of mechanical noise/artefacts.

The configuration of the preprocessing is determined based on the actual location of microphones relative to the accelerometer.

Such a preprocessor could include weighing of the signals from the 3 directions, which could represent an assumption that movement in one direction in less likely to stem from mechanical effects compared to other directions, which could be due to orientation/placement of other components in a hearing aid, such as touch buttons or other components that the user needs to interact with. In particular, the accelerometer axis which is orientated perpendicular to a microphone membrane might be more important to estimate the artefact sound level than the other axes.

The exact way how this pre-processing should be done for a particular configuration of a hearing aid may be derived in different ways. It could include measuring during calibration of how much of the vibration is actually picked up by each of the accelerometer axes which is then transferred into the microphone signal. The pre-processing could be derived by machine learning techniques. As a final stage of the pre-processing it may be advantageous to resample (e.g. sample and hold) the accelerometer signal to better match the audio sampling frequency for further processing.

The present disclosure further disclose that a hearing aid may comprise that the processor is configured to determine the artefact-likelihood based on signal obtained over a predetermined period of time.

This artefact-likelihood block 604 calculates the likelihood that the currently observed sound signal level is due to a mechanical artefact. The output is a signal in the range [0 . . . 1] with 0 meaning very low artefact likelihood and 1 meaning very high artefact likelihood. The purpose of this signal is to control the amount of attenuation that would be applied to the sound signal.

The likelihood could be calculated based only on the accelerometer input, i.e. if the accelerometer senses some strong movement, it may be assumed that there must be a sound artefact. A more robust way would be to compare, or at least based the determination of the likelihood on both, the accelerometer and sound signals. If the two signals show a similar level increase, it is most likely due to an artefact. More advanced techniques to calculate the likelihood including machine learning are also possible.

This could for instance be implemented by a buffer system, where input signals, or signals derived therefrom, from one or both of the input system and the accelerometer are stored for a given period of time, e.g., a number of seconds or a number of samples.

Accordingly, the processor is configured to determine the artefact-likelihood based on a correlation calculation between the signal from the level meter and the signal from the accelerometer. The correlation may be calculated based on the stored signals as suggested elsewhere, a part of detected signals or other suitable data based on the input system and/or accelerometer.

The processor is configured to determine if an attenuation is to be applied to the signal from the input system based on the likely hood that an artefact has occurred. If it is determined that noise in the input signal stems from mechanical interference, as outlined above, then a particular noise reduction may be applied to the input signal so as to suppress the noise and thus lessen the annoyance for the user.

The "calculate maximum attenuation" block 605 calculates the amount of attenuation that should be applied under the assumption that the current signal is a mechanical artefact. It may be assumed that mechanical artefacts are characterized by a fast level increase, i.e. such noises have a transient characteristic and "stick out" of the long-term average noise floor. Thus, it is possible to investigate or determine a rate of change of the signal to identify transient behaviour.

The approach to attenuate this noise is to estimate the difference between the instantaneous signal level and the long-term average noise floor per frequency band. By applying an attenuation which is equal to this level difference it is possible to reduce the sound level of the artefact to the level of the noise floor.

The processor is configured to determine a noise floor in the signal from the input system over a period of time. This period of time does not need to correspond to the period of time stored in the buffer as outlined above. The noise floor may e.g. be determined as an average value, e.g. a weighted average where the weights decreases over time i.e. old values have less weights compared to more recent values.

The artefact likelihood as described above is based on the accelerometer signal and the sound signals alone. Other measures, such as input from e.g. a feedback management system, may be used when determining the likelihood.

The output from the Artefact likelihood determination and the Calculate maximum attenuation blocks as illustrated may be combined 606, e.g. multiplied, and the result applied to the sound signal before further processing, e.g. for hearing loss compensations.

In some embodiments there is provided:

A method performed by a hearing aid (100) including at least one microphone unit (113), an accelerometer unit (112), and a processor, comprising:

determining a first sound signal level based on a microphone signal (ms) from at least one microphone unit;

determining a noise floor level (LN) based on the microphone signal from the at least one microphone unit (113);

determining a second sound signal level based on a difference between the first sound signal level and the noise floor level;

determining an acceleration level based on an acceleration signal (as) from the accelerometer unit (112);

generating a processed microphone signal (pm) including attenuating the microphone signal (ms), at least at a first time (t2), in accordance with a first attenuation value (av); wherein the first attenuation value (av) is based on determining a degree of similarity between the second sound level at the first time and the acceleration level at the first time.

REMARKS

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

ITEMS

There is also provided a hearing aid as set out in the below items.

1. A hearing aid comprising:
an input system comprising at least one microphone unit,
a level meter configured to receive a signal from the input system and the level meter configured to provide an output representing a current sound pressure level based on the signal from the input system,
an accelerometer configured to provide a signal representing movement of the hearing aid,
a processor configured to determine an artefact-likelihood based on signals from the level meter and the accelerometer.

2. The hearing aid according to item 1, wherein the processor is configured to determine the artefact-likelihood based on signal obtained over a predetermined period of time.

3. The hearing aid according to item 1 or 2, wherein the processor is configured to determine the artefact-likelihood based on a correlation calculation between the signal from the level meter and the signal from the accelerometer.

4. The hearing aid according to any one of items 1-3, wherein the processor is configured to determine if an attenuation is to be applied to the signal from the input system based on the likely hood that an artefact has occurred.

5. The hearing aid according to any one of items 1-4, wherein the processor is configured to determine a noise floor in the signal from the input system over a period of time.

6. The hearing aid according to any one of items 1-5, wherein the accelerometer is configured to provide a signal in 3 channels corresponding to 3 physical directions, where an accelerometer preprocessor is configured to determine a 1-channel accelerometer signal based on the 3-channel signal.

7. The hearing aid according to any one of items 1-6, wherein the artefact likelihood is based on the accelerometer signal alone.

8. The hearing aid according to any one of items 1-7, wherein artefact likelihood is determined using an artificial intelligence processor.

9. The hearing aid according to any one of items 1-8, wherein determination of artefact likelihood includes determining a rate of change of the signal from the accelerometer.

10. The hearing aid according to any one of items 1-9, wherein a level of attenuation is applied based on an estimate of the difference between an instantaneous signal level and a long-term average noise floor per frequency band of the signal from the input system.

The present disclosure provides a hearing aid comprising an input system comprising at least one microphone unit. The hearing aid further comprises a level meter configured to receive a signal from the input system and the level meter configured to provide an output representing a current sound pressure level based on the signal from the input system, and an accelerometer configured to provide a signal representing movement of the hearing aid. The hearing aid may further comprise a processor configured to determine an artefact-likelihood based on signals from the level meter and the accelerometer. Such a hearing aid, or alternatively a hearing device, is contemplated to alleviate noise arising from handling of the device and reduce the artefacts in a reliable way, or at least with improved certainty.

Using an accelerometer, or other motion sensor, it is possible to measure mechanical vibrations. Based on both input from the input system, e.g. two or more microphones in a hearing aid, and the input from an accelerometer in the hearing aid, it is then possible to estimate if it is likely that the current noise level in the input system stems from mechanical influences on the hearing aid or device housing and not in the, recorded or sensed, ambient sound scene.

The present disclosure provides at least an alternative to the prior art.

The present disclosure further disclose that a hearing aid may comprise that the processor is configured to determine the artefact-likelihood based on signal obtained over a predetermined period of time. This could for instance be implemented by a buffer system, where input signals, or signals derived therefrom, from one or both of the input system and the accelerometer are stored for a given period of time, e.g., a number seconds or a number of samples.

According to the present disclosure, the processor may configured to determine the artefact-likelihood based on a correlation calculation between the signal from the level meter and the signal from the accelerometer. The correlation may be determined using the processor. The correlation may be calculated based on the stored signals as suggested above, a part of detected signals or other suitable data based on the input system and/or accelerometer.

The processor according to the present disclosure may be configured to determine if an attenuation is to be applied to the signal from the input system based on the likelihood that an artefact has occurred. If it is determined that noise in the input signal stems from mechanical interference, as outlined above, then a particular noise reduction may be applied to the input signal so as to suppress the noise and thus lessen the annoyance for the user.

The processor may be configured to determine a noise floor in the signal from the input system over a period of time. This period of time does not need to correspond to the period of time stored in the buffer as outlined above. The noise floor may e.g. be determined as an average value, e.g. a weighted average where the weights decreases over time i.e. old values have less weights compared to more recent values.

The accelerometer may be configured to provide a signal in 3 channels corresponding to 3 physical directions. This could be expressed as x-, y- and z-axis. Further, an accelerometer preprocessor may be utilized and configured to determine a 1-channel accelerometer signal based on such 3-channel signal. This could be does to reduce the complexity of determining the likelihood of presence of mechanical noise/artefacts. Such a preprocessor could include weighing of the signals from the 3 directions, which could represent an assumption that movement in one direction in less likely to stem from mechanical effects compared to other directions, which could be due to orientation/placement of other components in a hearing aid, such as touch buttons or other components that the user needs to interact with.

According to the present disclosure, the artefact likelihood may be based on the accelerometer signal alone. Other measures, such as input from e.g. a feedback management system, may be used when determining the likelihood.

In a hearing aid according to the present disclosure, artefact likelihood may be determined using an artificial intelligence processor. The likelihood determination may include a neural network and/or machine learning. Such processing may be trained using input data showing different types of noise from mechanical sources, i.e. touching of the housing etc., and other types of noise with an indication which type of noise it really is.

According to the present disclosure, determination of artefact likelihood may include determining a rate of change of the signal from the accelerometer, i.e. how fast are signals changing.

According to the present disclosure, a level of attenuation may be applied based on an estimate of the difference between an instantaneous signal level and a long-term average noise floor, which may be applied per frequency band of the signal from the input system, i.e. the attenuation may be different between different frequency bands/channels.

All the above features and functions may be combined, either individually or as a number of features.

The invention claimed is:

1. A method performed by a hearing aid including at least one microphone unit, an accelerometer unit, and a processor, comprising:
    determining a first sound signal level based on a microphone signal from at least one microphone unit;
    determining a noise floor level based on the microphone signal from the at least one microphone unit;
    determining a second sound signal level based on a difference between the first sound signal level and the noise floor level;
    determining an acceleration level based on an acceleration signal from the accelerometer unit;
    generating a processed microphone signal including attenuating the microphone signal, at least at a first time, in accordance with a first attenuation value;
    wherein the first attenuation value is based on determining a degree of similarity between the second sound signal level at the first time and the acceleration level at the first time.

2. A method according to claim 1, wherein determining the degree of similarity includes determining a degree of correlation and/or a degree of coherence and/or a degree of cooccurrence and/or a degree of instant similarity between the second sound signal level and the acceleration level.

3. A method according to claim 2, comprising:
    determining a first envelope based on the second sound signal level or the first sound signal level;
    determining a second envelope based on the acceleration level;
    wherein the degree of similarity is based on the first envelope and the second envelope.

4. A method according to claim 2, comprising:
    determining the first attenuation value based on a mapping function between the degree of similarity and the first attenuation values.

5. A method according to claim 2, comprising:
    in accordance with the degree of similarity, being less than a first threshold value, setting the attenuation value to a first attenuation value;
    in accordance with the degree of similarity being greater than the first threshold value, setting the attenuation value to a value which is a function of the coherence value.

6. A method according to claim 1, comprising:
    determining a first envelope based on the second sound signal level or the first sound signal level;
    determining a second envelope based on the acceleration level;
    wherein the degree of similarity is based on the first envelope and the second envelope.

7. A method according to claim 6, comprising:
    determining the first attenuation value based on a mapping function between the degree of similarity and the first attenuation values.

8. A method according to claim 6, comprising:
    in accordance with the degree of similarity, being less than a first threshold value, setting the attenuation value to a first attenuation value;

in accordance with the degree of similarity being greater than the first threshold value, setting the attenuation value to a value which is a function of the degree of similarity.

9. A method according to claim 1, comprising:
determining the first attenuation value based on a mapping function between the degree of similarity and the first attenuation values.

10. A method according to claim 1, comprising:
in accordance with the degree of similarity, being less than a first threshold value, setting the attenuation value to a first attenuation value;
in accordance with the degree of similarity being greater than the first threshold value, setting the attenuation value to a value which is a function of the degree of similarity.

11. A method according to claim 1, comprising:
in accordance with the degree of similarity, being greater than a second threshold value, setting the attenuation value to a second attenuation value;
in accordance with the degree of similarity being greater than the second threshold value, setting the attenuation value to a value which is a function of the degree of similarity.

12. A method according to claim 1, wherein the attenuation value is based on the second sound level at the first time.

13. A method according to claim 1, wherein at least a range of the attenuation values are piecewise proportional or piecewise logarithmically proportional or piecewise exponentially proportional to the degree of similarity; and/or
the attenuation value is piecewise proportional or piecewise logarithmically proportional or piecewise exponentially proportional to the second sound signal level.

14. A method according to claim 1, comprising:
receiving a two-dimensional or three-dimensional accelerometer signal from the accelerometer and determining the acceleration level based on the two-dimensional or three-dimensional accelerometer signal; wherein the acceleration level is a one-dimensional signal or a two-dimensional signal.

15. A method according to claim 1, wherein determining the degree of similarity includes determining a likelihood of an event of the hearing aid being suddenly touched, stroked or hit.

16. A method according to claim 1, comprising:
filtering the signal from the accelerometer unit by a bandpass filter to provide bandpass filtered acceleration values; wherein the bandpass filter is configured to emphasize acceleration values associated with an event of the hearing aid being suddenly touched, stroked or hit over acceleration values associated with a head movement of the hearing aid.

17. A method according to claim 1, comprising:
converting one or more of the microphone signal and the acceleration signal into a time-frequency domain; and
performing one or more of the steps of the method based on the respective signals in the time-frequency domain to generate a processed microphone signal in the time-frequency domain.

18. A method according to claim 1, comprising:
converting the processed microphone signal, in the time-frequency domain, to a time-domain signal.

19. A hearing aid comprising a microphone unit, an accelerometer unit, and a processor, wherein the processor is configured to perform the method according to claim 1.

20. A hearing aid system comprising a first hearing aid and a second hearing aid, each in accordance with claim 19, wherein the hearing aid system is a binaural hearing aid system.

21. A hearing aid comprising
an input system comprising at least one microphone unit;
a level meter configured to receive a signal from the input system, the level meter being configured to provide an output representing a current sound pressure level based on the signal from the input system;
an accelerometer configured to provide a signal representing movement of the hearing aid; and
a processor configured to:
determine an artefact-likelihood based on signals from the level meter and the accelerometer,
applying artefact attenuation to the signal from the input system in response to a determination based on the artefact-likelihood that said artefact attenuation is to be applied.

* * * * *